United States Patent [19]

Miletto

[11] Patent Number: 4,974,519
[45] Date of Patent: Dec. 4, 1990

[54] TRANSFER SYSTEM WITH PALLETS HAVING WHEELS COMPRISED OF TWO ROLLERS, DRIVEN BY A BELT

[75] Inventor: Philippe Miletto, Orny, Switzerland

[73] Assignee: ISM Equipments Industriels de Montage S.A., Switzerland

[21] Appl. No.: 433,666

[22] Filed: Nov. 8, 1989

[30] Foreign Application Priority Data

Nov. 10, 1988 [FR] France ............... 88 14976

[51] Int. Cl.⁵ ............ B61B 9/00; B65G 25/00
[52] U.S. Cl. ............ 104/165; 198/465.2; 198/803.01
[58] Field of Search ........... 198/465.1, 465.2, 465.3, 198/803.01, 803.02; 104/165, 225, 226, 229, 231, 232, 233, 166

[56] References Cited

U.S. PATENT DOCUMENTS

| | | | |
|---|---|---|---|
| 3,013,499 | 12/1961 | Hubert | 104/165 X |
| 3,929,079 | 12/1975 | Ellassen | 104/165 X |
| 4,712,484 | 12/1987 | Sticht | 104/165 |
| 4,915,212 | 4/1990 | Derichs et al. | 198/465.2 |

FOREIGN PATENT DOCUMENTS

| | | | |
|---|---|---|---|
| 155586 | 12/1979 | Japan | 104/165 |
| 1-10419 | 4/1989 | Japan | 198/465.2 |
| 755701 | 8/1980 | U.S.S.R. | 104/165 |
| 601719 | 5/1948 | United Kingdom | 104/165 |

Primary Examiner—Joseph F. Peters, Jr.
Assistant Examiner—R. B. Johnson
Attorney, Agent, or Firm—Davis, Bujold & Streck

[57] ABSTRACT

A transfer system comprising a closed rail circuit and pallets circulating on the rails of the circuit. Each pallet comprises at least two wheels which are designed to be supported by the rails of the circuit and are driven by a belt. The respective wheels comprise an axle to which a first roller is mounted and a second roller is rotatably mounted on the periphery of the first roller by a bearing. The system reduces the wear of the drive belt and the rollers when the pallet is stationary by permitting the first rollers to be rotated by the continuously moving belt when the pallet is stopped.

5 Claims, 1 Drawing Sheet

U.S. Patent    Dec. 4, 1990    4,974,519
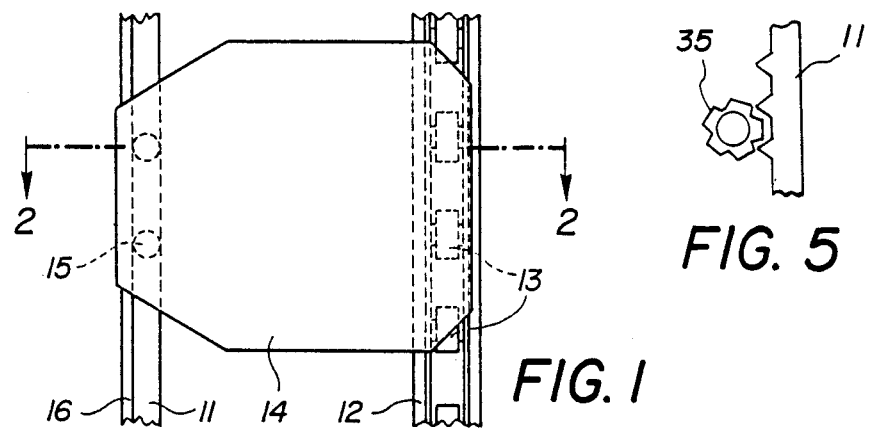
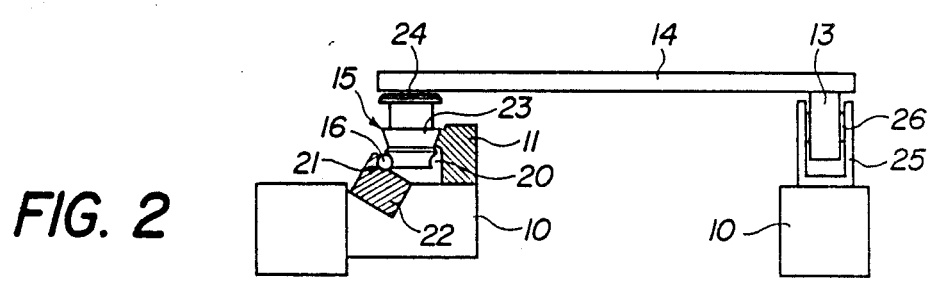
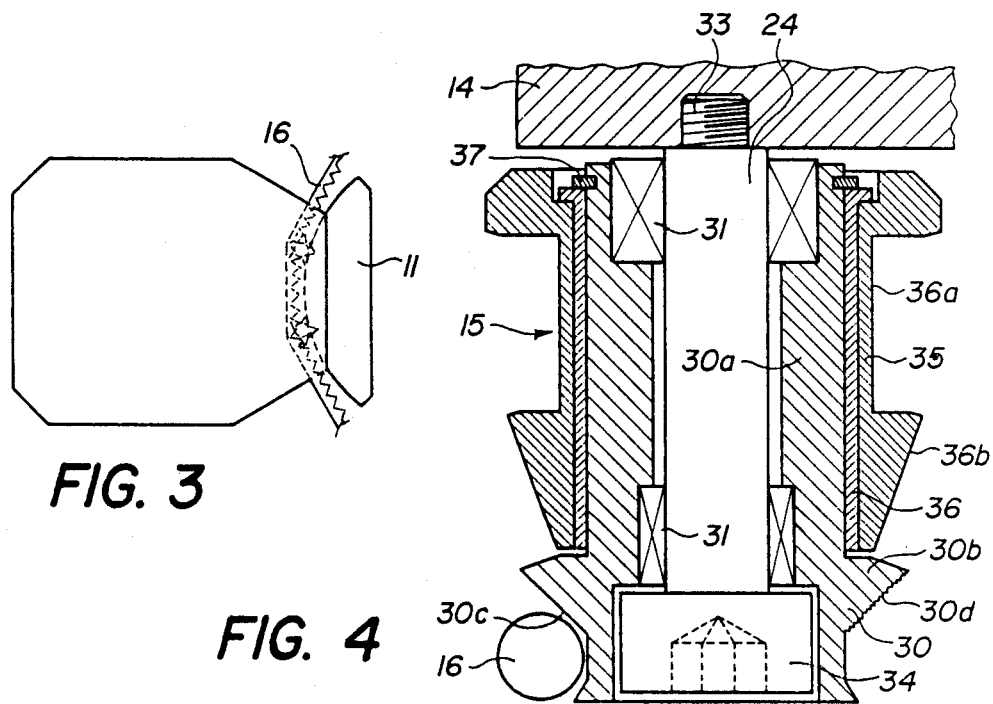

TRANSFER SYSTEM WITH PALLETS HAVING WHEELS COMPRISED OF TWO ROLLERS, DRIVEN BY A BELT

The present invention concerns a transfer system comprising a closed rail circuit, at least one pallet designed to move on this circuit, at least one drive belt designed to move said pallet on said circuit, this pallet comprising at least two drive wheels, whose axes are perpendicular to the plane of the pallet, these wheels being on the one hand in contact with said drive belt and on the other hand supported by a rail of said circuit.

In current transfer systems, of the type which comprises rails on which pallets transporting articles and/or components of assembly or mounting of these articles are driven by a drive belt, the pallets habitually comprise at least two drive wheels which are in permanent contact with the said drive belt, and which are supported by a rail which constitutes a lateral guiding element. In practice, the belt passes through a groove of these wheels and, owing to its elastic nature, it can press these latter against the guiding element, which has the effect of moving the pallets by making the drive wheels roll along the guiding element. These wheels generally have a profile which is designed to fulfil the following two functions simultaneously: support of the pallets and driving of these pallets. In any case, these two functions may be dissociated and the function of support may be ensured by wheels of a totally conventional form.

While in movement, the pallets undergo variations in trajectory and speed which are programmed depending on the articles carried by these pallets, and the operations of assembly, mounting or of machining, which these articles must undergo. It is usual for these pallets to stop in various stations known as manual, where an operator carries out a manual intervention, or to stop in a station known as automatic where the articles are acted on by an automatically controlled machine such as drill, screwing, riveting, or soldering machine etc.

However, during these pauses in the pallets' movement, the belt continues to be driven, which causes the drive wheels, which are pressed against the guiding element, to continue turning. When the pallet is stationary, the drive wheels cannot roll along the guiding element, but rub against this element, which results either in wearing of this guiding element or of the wheels, or even of the drive belt if this latter slides on the wheel without being able to drive it owing to the existence of a type of excessive friction between the wheel and the guiding element.

This wearing is extremely inconvenient and constitutes a major drawback to currently known installations. A prolonged stop of the pallets may cause overheating resulting in a local superficial fusion of the wheels or the guiding element, which are usually made of a synthetic material.

The present invention proposes to obviate these drawbacks by proposing a system in which the momentaneous stoppage of the pallets while the system is functioning, does not risk causing overheating and/or wearing which may damage the drive wheels, the guiding element, or the driving belt.

This aim is achieved by the system according to the invention characterised in that the said drive wheels each comprise at least one interior axis fixed to the pallet perpendicularly to its plane, a driving roller mounted so as to rotate freely on this axis, and designed to be in contact with said belt, a bearing mounted on the said driving roller, and a driven roller mounted on the periphery of the said bearing and provided to be pressed against the said rail.

According to a particular embodiment of the invention, the drive belt is smooth and of circular cross-section and the driving roller comprises a groove whose profile corresponds to the shape of the circular cross-section of the said belt.

According to one variant of the embodiment, the driving roller comprises a groove equipped with corrugations.

According to another type of embodiment, the belt is notched and the driving roller comprise teeth whose profile corresponds to the notches in the belt.

According to a particularly useful form of an embodiment, the rail has a hooked toothed profile and the driven roller comprises teeth designed to slot into those of the rail.

The present invention will be better understood by referring to the description of an example of an embodiment and the annexed diagram, in which:

FIG. 1 represents a view from above of a rectilinear section of the system according to the invention, FIG. 2 represents a cross-section along the line I—I of FIG. 1 of the system according to the invention, FIG. 3 represents a plane view of a curved section of the system according to the invention, and FIG. 4 shows a cross-section of a drive wheel of the system according to the invention; and FIG. 5 shows a diagrammatic representation of the driven (second) roller with teeth engaging teeth of the rail of the circuit.

With reference to the figures, the installation comprises a bearing structure composed of support profiles 10 on which is mounted a closed circuit preferably provided of rails 11 and a carrying means 12 equipped with a series of casters 13 or a series of rotating rollers mounted so as to rotate freely. This support may be replaced in certain embodiments by a second rail or by an appropriate supporting surface.

Pallets 14, having a horizontal load supporting surface, are designed to circulate on the closed circuit and in particular to be supported by the rails 11 and on the rollers 13. To this end, the pallet comprises two drive wheels 15 which will be described in more detail later with reference to FIG. 4. These drive wheels are in permanent contact with a drive belt 16 which is preferably of a circular cross-section and has elastic properties. Also, they are supported by the rails 11 which constitute in the example shown here, a guiding element and also an element bearing the pallet. It is seen that these two functions could be fulfilled by two different elements. In the case where the supporting means is replaced by a rail or by a supporting surface, the pallet may comprise at least one and preferably two or more rolling elements conceived to be supported by this rail or this supporting surface, and which may consist of casters, rollers, ball-bearings, sliding shoes etc.

As shown more particularly in FIG. 2, the drive wheels 15 comprise a concave groove having, for example, a semi-circular section 20 in which the drive belt 16 lodges, which, on a rectilinear section, slide in a conduit 21 of a substantially semi-circular section situated on a guide piece 22 supported by the profiles 10 of the bearing structure. In addition, the driving wheels 15 comprise a truncated cone-shaped section 23 designed to define the support surface which co-operates with the rails 11. The shape of this section may be different, for example cylindrical. The drive wheels 15 are carried on an axis (axle) 24 perpendicular to the plane of the pallet 14. In currently known systems, the drive wheels comprise both a fixed axis 24 and a single moulded piece, rotating freely on this said axis, which is designed so as to simultaneously provide the contact groove for the drive belt and the supporting surface of support against the rail.

As shown in FIG. 2, the rollers 13 are carried by a U-shaped profile 25 which is itself supported by the profiles 10 of the bearing structure. The rollers 13 are mounted on a transverse axis and turn freely.

FIG. 3 represents a curved section of the installation described above. In this case, the belt, which is lodged in the semi-circular groove 20 of the drive wheels, passes "within" the pallet and creates owing to its elasticity, a relatively high pressure which the drive wheels exert against the guiding element constituted by the rectilinear sections of the rails 11.

It is easily understood that if the pallets are stopped along a curved section of the installation, the belt, which continues turning during the pause in the movement of these pallets, causes an increased friction of the drive wheels on the guiding element, which may produce a mechanical wearing or an over-heating of the two materials in contact and consequently a wearing or a premature fatigue of the belt.

This problem has been satisfactorily resolved by the construction of drive wheels such as shown in FIG. 4. Each drive wheel comprises as before, a central axis (axle) 24 solid with the pallet and perpendicular to its plane. On this axis 24 is mounted a driving (first) roller 30, by means of two bearings 31. The central axis 24 comprises an end part with a screw thread 33 which screws into a threaded bore of the pallet and a head 34 of type Imbus which ensures that the bearing 31 stays in place. A driven (second) roller 35 is mounted on the periphery of the driving roller 30 after the interpositioning of a bearing 36 having a substantially tubular profile. The driving roller comprises a section 30a which is substantially cylindrical, so as to present a peripheral cylindrical surface whose diameter is substantially equal to the interior diameter of the bearing 36, and a profiled section 30b which comprises a groove 30c provided to receive the drive belt 16. This groove may have a semi-circular profile, or as shown in FIG. 4, a section with rectilinear sides. The surface of one or more of these sides for example 30d, may be striated, corrugated, or sanded so as to improve contact between the belt and the driving roller.

The driven roller comprises an interior cylindrical surface whose diameter is substantially equal to the external diameter of the bearing 36 and an external profile defining a U-shaped groove 36a, and a cross-section 36b which in this example has the shape of a truncated cone, but which could have another profile and which defines a support surface intended to cooperate with the active surface of the rails 11.

A circlip 37 ensures that the bearing 36 maintains its position on the driving roller 30.

Owing to the drive wheel being composed of these three elements i.e. the driving roller, the bearing and the driven roller, in the case of a pallet stopping, the driving roller can continue to be driven while the driven roller stays stationary in contact with the rail owing to the presence of the bearing. It is seen that the friction between the surfaces of the bearing and the corresponding surfaces of the drive roller and of the driven roller is smaller than the effect of friction of the driving roller with its belt and that of the friction of the driven roller with its support. It suffices however to ensure, during the normal functioning of the installation, the driving of the driven roller by the driving roller by the intermediary of the bearing. It is seen however that the driving forces increase according to the load of the pallets, which is explained by Newton's Law which states that the reaction increases proportionally to the action, the action corresponding to the load of the pallet and the reaction to the driving force transmitted to the driven roller.

By means of this construction, the desired end is achieved, allowing the suppression of the principal means of wear of the guiding elements constituted by the rails, the drive wheels and the belt of existing systems. It is obvious that the profile of the peripheral surfaces of the driving or driven rollers may be modified according to the usage requirements and the embodiments. The driving roller may have a smooth or corrugated profile. The belt may be smooth or notched. The driven roller may also have a smooth or toothed profile and the rail may have a smooth or hooktoothed profile. In the case where friction produces the drive, the friction may be increased by treating the surfaces appropriately.

What is claimed is:

1. A transfer system comprising a closed rail circuit, at least one pallet with a horizontal load supporting surface, said pallet being designed to move on said circuit, at least one drive belt mounted in said circuit and designed to move said pallet along a path defined by said circuit, said pallet comprising at least two driven wheels with axles mounted perpendicular to said surface, each of said wheels having two rollers, one roller being in contact with said drive belt, and the other roller being in contact with a rail of said circuit, characterized in that the said driven wheels each comprise at least one axle (24) fixed to said pallet (14) perpendicularly to said surface, a first roller (30) mounted so as to rotate freely on said axle and designed to be in contact with said belt (16), a bearing (36) with an interior surface fixedly mounted on said first roller (30), and a second roller (35) rotatably mounted on the periphery of the said bearing, said second roller including means adapted to be supported by said rail (11) of said circuit and means (13) in said circuit for supporting said pallet in an area spaced from said wheels.

2. System according to claim 1, characterized in that said belt (16) is smooth and of circular cross-section and said first roller (30) comprises a groove (30c) whose profile substantially corresponds to the shape of said belt.

3. System according to claim 1, characterized in that said first roller comprises a groove designed to receive said belt (16) and said groove contains projections to improve contact between said belt and said first roller.

4. System according to claim 1, characterized in that said belt (16) includes notches thereon and said first roller (30) comprising teeth adapted to engage said notches.

5. System according to claim 1, characterized in that the rail (11) of said circuit includes teeth and said second roller (35) comprises teeth designed to engage the teeth of the rail.

* * * * *